Aug. 5, 1952     R. R. ALLEN     2,605,582
INLET TUBE FOR USE IN BAIT TRAPS
Filed July 24, 1946
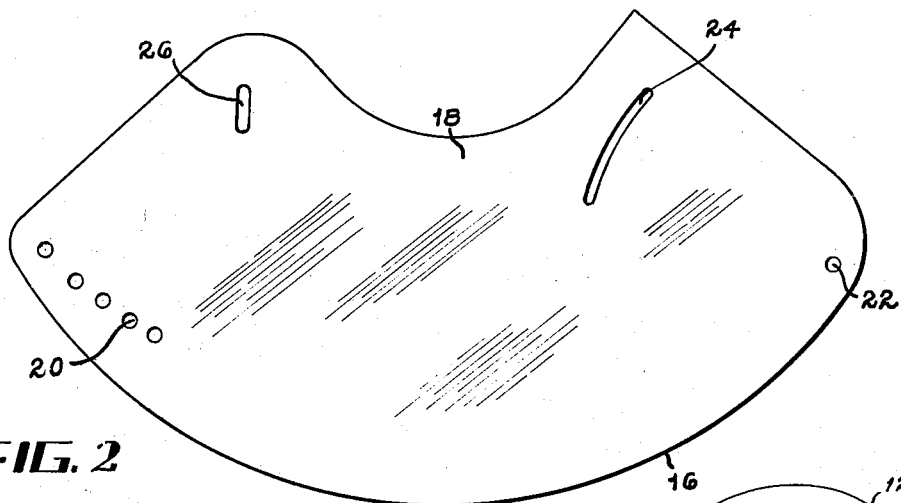
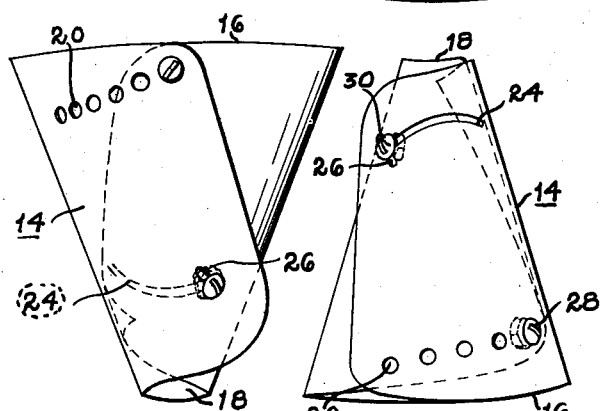
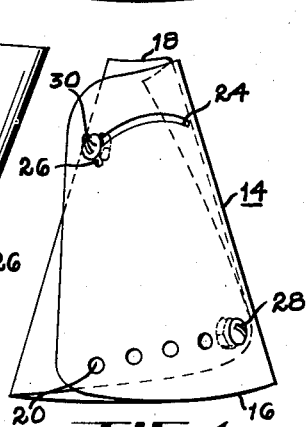
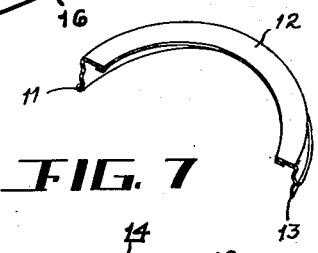
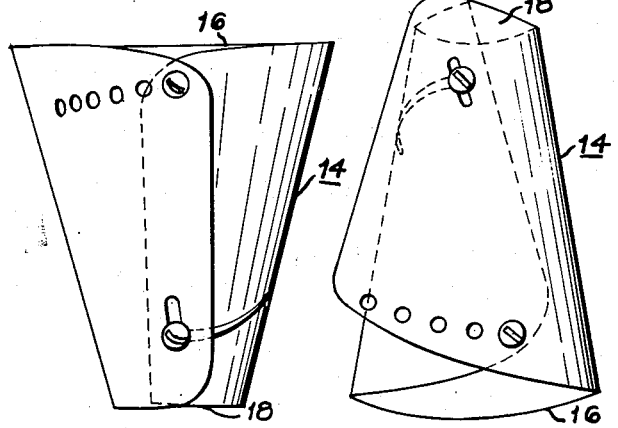
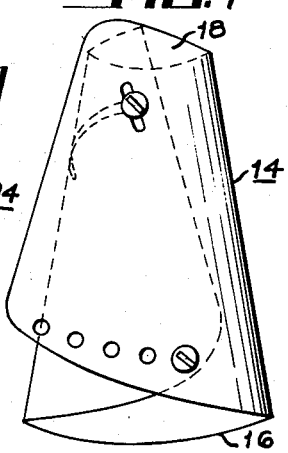
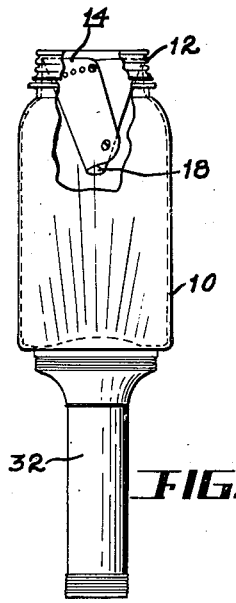
INVENTOR.
Roney R. Allen
BY
Henry G. Dyberg
His ATTORNEY Patented Aug. 5, 1952

2,605,582

UNITED STATES PATENT OFFICE 2,605,582

INLET TUBE FOR USE IN BAIT TRAPS

Raney R. Allen, Dayton, Ohio

Application July 24, 1946, Serial No. 685,896

1 Claim. (Cl. 43—65)

This invention relates to an inlet tube for use in a bait trap and more particularly to an inlet tube that is adapted for use in a glass jar, although not necessarily so limited.

An object of this invention is to provide a device for insertion into the mouth of a container, such as a glass jar, which device is adjustable for various sizes of containers and is adjustable for various sizes of baits, which device is easily produced, quickly assembled and mounted into position and at the same time efficient, dependable and convenient.

Another object of this invention is to provide an inlet tube for use in a bait trap which inlet tube is made from transparent or translucent sheet material held in position so as to form a frustum conical member having an entrance opening for the bait in the apex thereof.

Other objects and advantages reside in the construction of parts, the combination thereof and the mode of operation, as will become more apparent from the following description.

In the drawings:

Figure 1 is a side elevational view of a jar with parts broken away to show the bait trap.

Figure 2 is a plan view of a blank used in forming the inlet tube.

Figures 3, 4, 5 and 6 disclose the inlet tube removed from the jar, which inlet tube is adjusted into various positions.

Figure 7 is a fragmentary view of a ring for holding the inlet tube in position.

Referring to the drawings, the reference character 10 indicates a glass jar, such as a Mason jar, having an open capping ring 12 threadedly engaging the threads on the jar, the opening in the capping ring registering with the open end of the jar and being substantially equal in size. An inlet tube 14, provided with an enlarged end 16 and a reduced end 18, is positioned in the mouth of the jar and held in position by the margin of the large end of the inlet tube overlying the mouth of the jar and engaged by the flange of the capping ring 12.

This inlet tube 14 is made from a blank shown in Figure 2. This blank, consisting of an arcuate sector, is preferably stamped from sheet material that is flexible and transparent or translucent. The inlet tube 14 forms a funnel-shaped opening for the mouth of the jar. If this trap is used for minnows or other types of bait found in water, it is necessary to provide an escape for the water displaced by the bait when the bait enters the trap. In order to provide the trap with fluid escaping passages, the inlet tube is provided with a plurality of apertures 20 adjacent one corner and a single aperture 22 adjacent another corner.

A slot 24 is found near one corner and another slot 26 adjacent another corner. A screw 28 is passed through the selected aperture 20 and the aperture 22, so as to form the large end of the inlet tube. A screw 30 is passed through the slots 24 and 26. These screws are held in position by suitable nuts, preferably in association with lock washers.

By selecting the proper hole for the screw 28, the proper size of the large end is thus obtained, so that the inlet tube may be used for various sizes of containers, such as Mason jars and the like.

The ring 12, as may best be seen by referring to Figure 7, is provided with a bead 11 similar to conventional rings used in association with certain makes of caps for glass jars. The bead has been flattened at 13, so as to form a screw driver edge that may be used in loosening and tightening the screws 28 and 30, thereby expediting the adjustment of the trap to various sizes.

In order to permit the use of the trap with various sizes of bait, the open end, that is, the small end of the inlet tube, may be adjusted by loosening the screw 30 and manipulating the blank so as to change the size of the opening. This is accomplished by the cooperation of the two slots, the one slot 24 adjusting the diameter of the opening and the transverse slot 26 permitting adjustment of the overlapped layers of the blank. After the opening 18 has been adjusted to the proper size, the screw 30 is again tightened, so as to hold the parts in adjusted shape. The unused apertures 20 and the unused portions of the slot 24 form passages for fluid, whether water or air. Thus, when the bait enters the trap, the displaced fluid flows out through the apertures and slots. Furthermore, the passages expedite the filling of the trap with water when submerged.

This bait trap may be used for minnows by placing in the jar anything that may attract the bait. Minnows will enter through the reduced end 18 and upon getting into the jar, will in all probability fail to escape.

The device may also be used for catching other baits in water, or it may be used in catching insects and bugs, especially at night. If it is used for catching bugs at night, the opening 18 is preferably reduced to the proper size and a flashlight 32, or an electric bulb, may be placed at the bottom of the jar, so as to direct the light towards the open end of the jar. If it is used in this manner, it is preferable to cover the jar and the flashlight with an opaque material or screen, so that the light will emanate through the open end of the jar, thereby attracting the insects or bugs.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

In a bait trap, the combination of a threaded Mason jar having an open capping ring threadedly engaging the threads on said jar and an inlet tube clamped by said ring against the jar, said inlet tube comprising a transparent flexible sheet material having a funnel-shape and clearly defined lateral edges and a series of openings adjacent the larger end of the tube and a series of apertures adjacent the smaller end of the tube, some of the apertures and openings being adjacent said lateral edges, said apertures being adapted to overlap each other, securing means extending through said overlapping apertures, one of said openings adapted to be positioned selectively in alignment with another of said openings, and securing means extending through said aligned openings, some of said openings being adapted to be free of alignment with other of said openings when said latter securing means is in said aligned openings, the free openings being adjacent to and spaced from the capping ring and permitting a flow of water therethrough from one side to the other of said funnel.

RANEY R. ALLEN.

REFERENCES CITED

The following references are of record in the file of this patent:

UNITED STATES PATENTS

| Number | Name | Date |
|---|---|---|
| 111,291 | Williams | Jan. 24, 1871 |
| 719,820 | Leigh | Feb. 3, 1903 |
| 1,139,717 | Pipenhagen | May 18, 1915 |
| 1,362,244 | Farley | Dec. 14, 1920 |
| 1,538,171 | Dailey | May 19, 1925 |
| 1,577,630 | Yerger | Mar. 23, 1926 |
| 1,837,148 | Davis | Dec. 15, 1931 |
| 2,339,565 | Goldberg | Jan. 18, 1944 |
| 2,425,333 | McCarl | Aug. 12, 1947 |